Patented Dec. 10, 1929

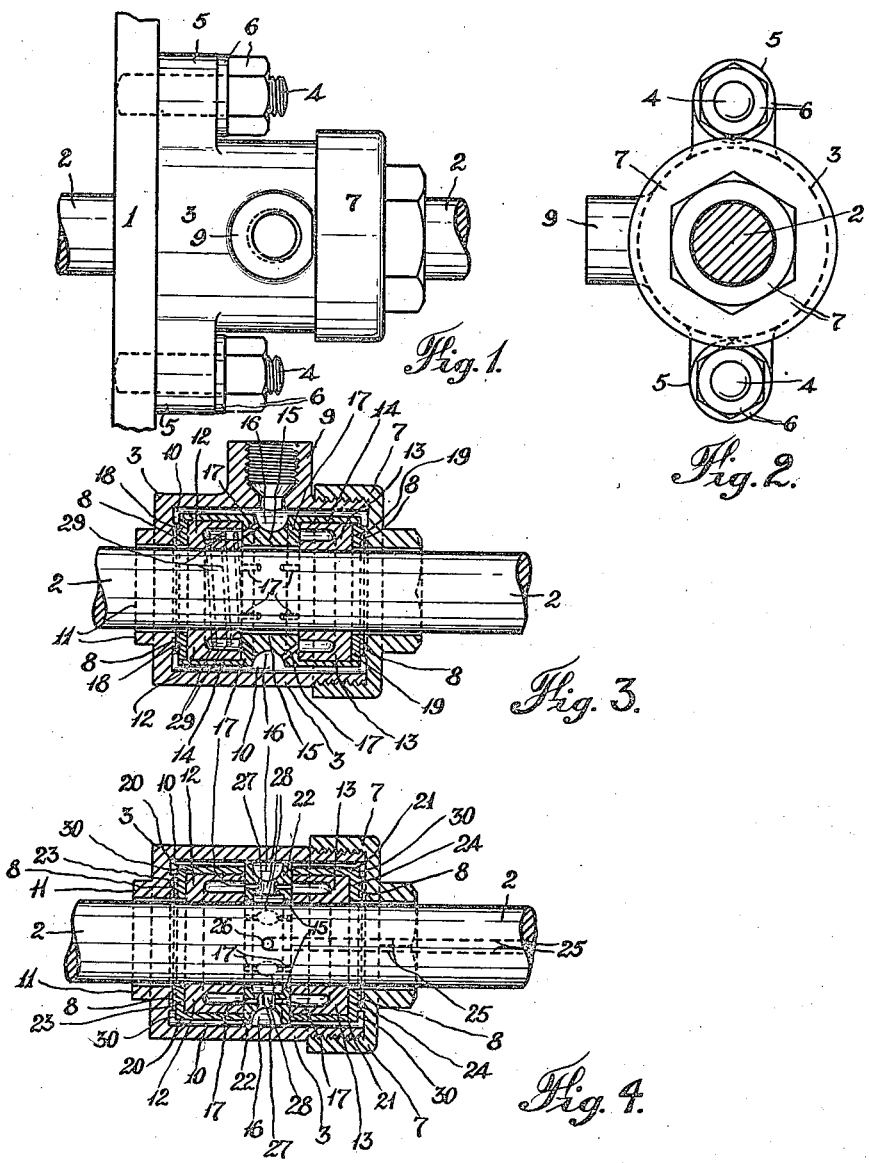

1,738,619

UNITED STATES PATENT OFFICE

JAMES HENRY STUTHRIDGE AND THOMAS MOXHAY HACK, OF JOHANNESBURG, TRANSVAAL, SOUTH AFRICA

MEANS FOR MAKING FLUID-TIGHT JOINTS AROUND ROTATING SHAFTS AND THE LIKE

Application filed May 5, 1927, Serial No. 189,071, and in the Union of South Africa June 2, 1926.

This invention relates to means applicable for making water, steam or other fluid-tight joints around rotating shafts or the like.

The invention can be applied or adapted generally to cases where it is necessary or desirable to prevent leakages of fluid around a rotating shaft or the like, and as uses to which the invention may be applied we may specifically mention the shaft of centrifugal pumps, turbines, and other fluid-actuated machines, and forced feed lubricating means or devices. In the case of fluid-actuated machines the fluid pressure for the machine may be conveniently utilized to provide the fluid pressure employed in the means for making the joints according to the present invention. The invention may be applied generally in cases in which fluid-tight joints are presently made by means of stuffing boxes and glands or the like and the pressure be obtained from any convenient source.

Means according to the invention may be termed a floating, automatic, fluid-tight packing device, and an enclosing casing, which device surrounds the rotating shaft and revolves therewith.

The invention will be more fully explained in connection with the accompanying sheet of drawings, illustrating two practical embodiments of the same. In the drawings, Fig. 1 is a plan view of the enclosing casing of the device, showing it fixed to a portion of the machine, et cetera, with a portion of the rotating shaft in position therein.

Fig. 2 is a front elevation of Fig. 1.

Fig. 3 is a central sectional elevation of the device showing the rotating shaft in position therein, and Fig. 4 is a view similar to Fig. 3, illustrating a slightly modified form of the invention.

Referring more particularly to that embodiment of the invention represented in Figs. 1, 2 and 3, the numeral 1 denotes a portion of the casing, shell or wall of the machine, et cetera, through an aperture in which the rotating shaft or the like 2 passes, and between the portion of the shaft 2 without the casing 1 and said casing, the fluid-tight joint is to be made. The fluid-tight jointing means includes what we may designate an enclosing casing or housing 3, which may, as shown, be made as a separate or detachable part from the machine, et cetera, casing, and be attached to the outside thereof by the studs 4 which engage in holes in lugs 5 formed on the casing or housing 3; 6 representing the retaining nuts and washers. Alternatively, the enclosing casing or housing 3 may be constructed in one piece with the machine, et cetera, casing 1. The outer end of the casing or housing 3 is shown provided with a screw-thread to receive a screw-threaded cap or cover 7, which is constructed in its outer portion of hexagonal shape for the purpose of screwing it on to or off the casing or housing 3. Both the cap or cover 7 and the casing 3 are constructed interiorly with raised surfaces 8 for a purpose hereinafter referred to.

The casing or housing 3 is constructed with a fluid inlet branch 9 for making connection with the pressure fluid supply pipe—not shown. The interior of the casing or housing 3 provides a fluid space or chamber 10 around the parts of the device which surround the shaft 2 and rotate with it within the casing 3. The inlet through the branch 9 communicates with the fluid space 10 in the casing 3. The opening through the rear end of the casing 3 and the opening through the cap or cover 7 are made of such a size that the shaft 2 is a loose fit therein. In order to centre the device, the casing 3 at the rear end may, as shown, be constructed with a projection 11 adapted to project into the hole through the casing 1 or a recess formed around the outer end of the hole.

Within the casing 3 is arranged the automatic, water-tight packing means which includes two oppositely disposed rings 12, 13, of india-rubber, leather, or other suitable flexible or resilient material, comprising inner and outer parts connected together at the outer ends, or in the form of U or ordinary hydraulic packing rings. These rings 12, 13, surround portion of the shaft 2, and are positioned with their open inner ends facing or opposite each other. The rings 12, 13, are enclosed or housed in a cylindrical casing or container 14 which they more or less fit, and which may be made of brass or other suitable non-corrosive material, and is exteriorly somewhat smaller than the interior of the casing 3 so forming the annular fluid space 10. The cylindrical casing or container 14 in this form of the invention, is constructed interiorly with a central annular projection 15 which forms a distance piece between the inner ends of the packing rings 12, 13. The casing or container 14 is formed with a central peripheral groove 16.

A plurality of lateral holes or passages 17 are formed in the projection 15 leading from the groove 16 to the sides of the projection 15 in front of the open ends of the packing rings 12, 13. Through these holes or passages 17 pressure fluid is free to pass to the interior of the packing rings 12, 13.

In the ends of the casing or container 14 and abutting the outer ends of each of the india-rubber, et cetera, packings 12, 13, anti-friction washers 18, 19, are placed, which may be of vulcanite, ebonite, phosphor bronze, or any other suitable metal or material. The washers 18, 19, are preferably a loose fit in the ends of the casing 14 and around the shaft 2, and they contact with the raised surfaces 8 at the opposite ends of the fluid space 10 in the casing 3 and make the fluid-tight joints therewith.

It follows from the foregoing description that the cylindrical casing or container 14, together with the packing rings 12, 13, and the anti-friction washers 18, 19, all rotate freely with the shaft 2 in the casing or housing 3, and that the action of the pressure fluid on the packing rings 12, 13, makes the fluid-tight joint round the shaft 2, and between the washers 18, 19, and the raised surfaces 8, and so precludes the escape of the fluid along shaft 2 in either direction, whilst allowing the various parts which are housed within the casing or housing 3 to rotate freely with the shaft 2.

In the modified form of the invention shown in Fig. 4, in which the pressure fluid is passed through the shaft 2 into the device, the cylindrical casing is constructed in three separate parts or sections, namely two end sections or containers 20, 21, and an intermediate central section 22. Each of the end sections 20, 21, forms a housing for one of the hydraulic packing rings 12, 13, and said end sections 20, 21, are constructed at their outer ends with inwardly directed flanges 23, 24, respectively, which serve as or take the place of the loose anti-friction washers 18, 19, of the construction illustrated in Figs. 1 to 3. If desired anti-friction washers may be provided in addition to or in lieu of the flanges 23, 24.

25 represents a hole formed longitudinally of the shaft 2 for making connection with the pressure fluid supply, and 26 is a transverse hole in the shaft 2 communicating with the hole 25 and opening into an internal annular recess 27 formed in the intermediate section 22. The intermediate or centre section 22 is provided with a plurality or ring of radial holes 28 through which the fluid can pass from the recess 27 to the peripheral recess 16 and thence into the fluid space 10. The lateral holes 17 are formed through both sides of the centre section 22 and communicate with the radial holes 28 to allow of the passage of the fluid from holes 28 to the interior of the hydraulic packings 12, 13.

As is shown in dotted lines in connection with the hydraulic packing ring 12 in Fig. 3, helical or coiled springs 29 may be arranged inside either or both of the hydraulic packings 12, 13, so that said springs 29 will aid the fluid pressure to force the anti-friction washers 18, 19, the more tightly against the raised portions 8 at the ends of the fluid space 10. Obviously springs, such as 29, could be used in conjunction with the modified form of the invention shown in Fig. 4.

By providing the raised surfaces 8 on the inner ends of the casing or housing 3, and by reducing the outer ends of the end sections 20, 21, as indicated at 30, the pressure of the fluid in the fluid space 10 can act on portions of the washers 18, 19, or end sections 20, 21, and so counteract any excess of pressure that may be put on the washers 18, 19, or flanges 23, 24, by the action of the fluid pressure on the hydraulic packing rings 12, 13.

What we claim as our invention and desire to protect by Letters Patent is:—

Means for making a fluid-tight joint around a rotating shaft or the like, including a stationary casing through which the shaft passes and to which fluid under pressure is admitted, two oppositely disposed hydraulic packing rings arranged around the shaft, and a container in which the packing rings are arranged, the packing rings and the container being rotatable with the shaft inside the stationary casing, and the packing rings being pressed outwardly towards the ends of the casing by the pressure fluid to make the joints between the transverse faces at the ends of the container and the ends of the stationary casing at the inside, as set forth.

In testimony whereof we have signed our names to this specification.

JAMES HENRY STUTHRIDGE.
THOMAS MOXHAY HACK.